United States Patent [19]
Randau et al.

[11] 3,855,130
[45] Dec. 17, 1974

[54] COLUMN FOR PRESSURE CHROMATOGRAPHY

[75] Inventors: Dieter Randau, Itzehoe; Wolfram Schnell, Darmstadt, both of Germany

[73] Assignee: Merck Patent Gesellschaft mit beschrankter Haftung, Darmstadt, Germany

[22] Filed: Dec. 6, 1972

[21] Appl. No.: 312,726

[30] Foreign Application Priority Data
Dec. 7, 1971 Germany.............................. 7146039

[52] U.S. Cl................................ 210/198 C, 55/386
[51] Int. Cl............................................ B01d 15/08
[58] Field of Search................. 210/198 C, 31, 433; 55/386, 197

[56] References Cited
UNITED STATES PATENTS
3,319,403  5/1967  Rose et al............................ 55/386
3,712,473  1/1973  Ellenberg........................ 210/433 X FOREIGN PATENTS OR APPLICATIONS
1,525,794  7/1970  Germany............................ 55/386

Primary Examiner—John Adee
Assistant Examiner—Ferris H. Lander
Attorney, Agent, or Firm—Millen, Raptes & White

[57] ABSTRACT

Column for chromatography under pressure having an outer steel column and an inner glass column filled with adsorbent, with an interspace therebetween maintained and sealed by an elastic material.

5 Claims, 1 Drawing Figure

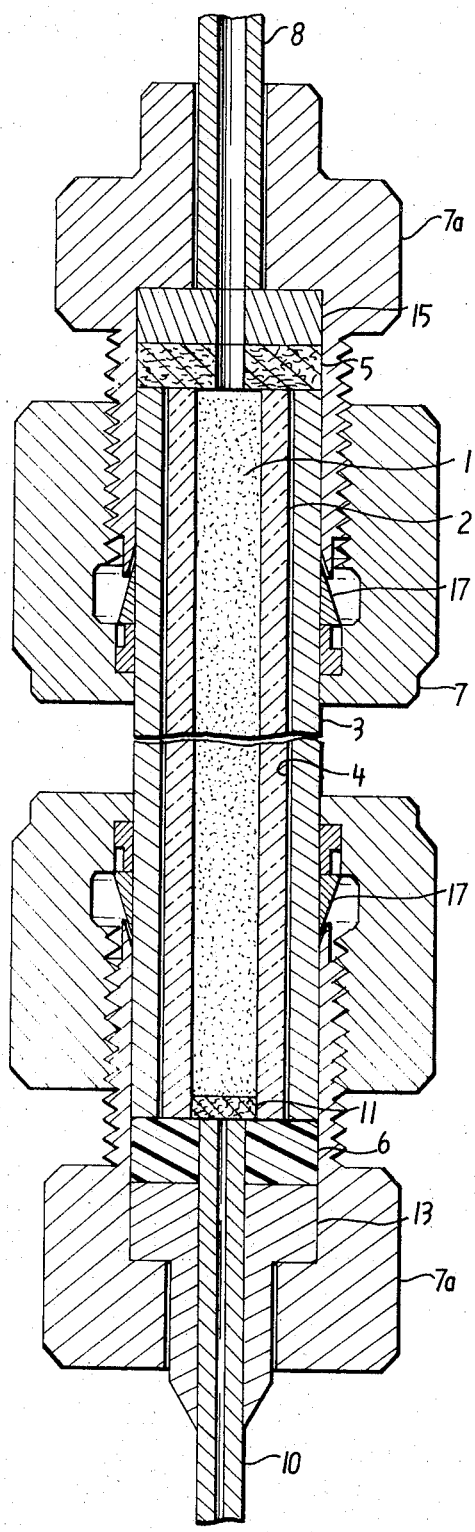

COLUMN FOR PRESSURE CHROMATOGRAPHY

BACKGROUND OF THE INVENTION

This invention relates to pressure chromatographic columns.

Liquid column chromatography has developed into a rapid chromatographic method by the use of pumps to increase flow rate. In a conventional liquid chromatographic separation under pressure, steel columns having a length of up to 1 meter and filled with an adsorbent, e.g., silica gel, are used. These columns are connected, via couplings, with a pump system and/or a detector. During the chromatographic separation, pressures of up to 250 atmospheres or even higher are maintained at the column inlet.

It is known that the characteristics of the material forming the chromatographic column wall have a great influence on the separation. It is also known that glass is particularly well suitable for liquid chromatography, especially with respect to plate numbers. However, the use of glass in liquid chromatography under pressure has heretofore encountered great difficulties due to the sealing problems in the transition from steel to glass and due to the danger of breakage accompanying the use of glass.

According to this invention, using the special steel glass composite construction of the novel column for chromatography under pressure, it is now possible to achieve the advantages of both glass and steel, while at the same time eliminating the disadvantages thereof.

SUMMARY OF THE INVENTION

This invention relates to a column for liquid chromatography under pressure, characterized in that a glass pipe adapted to be filled with adsorbent is coaxially positioned within a larger steel column with a narrow interspace between the inner wall of the steel pipe and the outer wall of the glass pipe, which interspace is sealed at the outlet end of the column and in fluid communication with the interior of the glass pipe at the inlet end of the column.

A thus-constructed column exhibits great advantages. Glass as the wall material for the inner wall of the column effects a substantially larger number of plates than metals. Moreover, glass, being a super-cooled melt, has a very smooth surface and normally does not exhibit properties which would interfere with the chromatography.

It is surprising that glass can be utilized in this way for liquid chromatography under pressure. It was to be assumed that the glass tubes, particularly thin-walled glass tubes, would burst at the high pressures employed in pressure chromatography. Moreover, it did not appear possible to establish an absolutely tight connection between the glass and the metal, due to the brittleness of the glass.

SUMMARY OF THE DRAWINGS

The appended drawing shows a specific embodiment of a column according to the invention in a longitudinal cross-sectional view.

DETAILED DISCUSSION

In the chromatographic column of this invention, a chromatographic carrier material 1 is packed in an inner glass pipe 2, coaxially mounted in a larger outer steel pipe 3. A slight difference in the outer diameter of the glass column and the inner diameter of the steel column provides a narrow interspace 4 between the glass and the steel pipes. Pressfitted against the feed or inlet ends of the glass and steel pipes is an annular packing ring 5, formed of a porous material, which provides restricted fluid communication between the center of the column and the interspace between the steel pipe 3 and the glass pipe 2, thereby permitting an equilization of pressure therebetween. Fitted against the bottom end of the steel and glass pipes is a resilient gasket 6 which seals the interspace between the steel pipe 3 and the glass pipe 2, seals the bottom end of the steel pipe 3 and provides a pressure pad for the bottoms of the pipes. Gasket 6 is pressed into a gas tight fit against the bottom ends of the glass and steel pipes by an annular sleeve 13 having a larger upper end corresponding in diameter to the gasket 6 and a narrower lower end, this annular sleeve 13 being a part of the coupling.

Fitted in a gas tight fit through sleeve 13 and gasket 6 is an outlet line or conduit 10 providing communication from the bottom end of glass pipe 2 to a conduit providing fluid communication with a detector and liquid collection means (not shown). A plug 11 of highly porous material prevents chromatographic carrier material from entering outlet line 10. Pressed into a gas tight fit against the packing ring 5 is an annular gasket 15 onto whose upper face is mounted an inlet line or conduit 8 communicating with a conduit to a liquid pump (not shown). The axial bore in packing ring 5 and gasket 15 provides fluid communication between inlet line 8 and the upper end of glass pipe 2.

The chromatographic column is sealed by a pair of coupling fittings on the respective ends of the column, each consisting of a threaded female sleeve member 7, slip fitted onto the steel pipe and facing outwardly toward an end of the steel pipe, a correspondingly threaded male sleeve member 7a, also slip fitted onto the steel pipe 3 and threaded into the corresponding female member 7, and annular wedge shaped stop 17 fitted in a shoulder at the base of the female member 7. The head of the upper male coupling member 7a has a larger axial bore into which are fitted the gasket 15, the packing ring 5 and the upper ends of the glass and steel pipes and the base of the upper male member 7a has a smaller axial bore into which is fitted the inlet line 8. Similarly, the larger diameter upper end of sleeve 13, the gasket 6 and the lower ends of the glass and steel pipes are fitted into the larger bore in the head of the lower male coupling member and the smaller diameter lower end of sleeve 13 is fitted into the smaller bore thereof.

By first slipping the female members 7 of the coupling fittings onto the respective end portions of the steel pipe 3, pressing the male members 7a thereof tightly against the respective ends of the steel and glass pipes and then threading the female members onto the male members until the ends of the male members are wedged tightly against the stops 17, the column becomes sealed against leaks.

A column constructed in this manner can be utilized at very high pressures. The inner glass pipe withstands the pressures, even when very thin-walled glass tubes are employed. When using the column of the present invention, the interspace 4 becomes filled with the eluent and the interior of the glass pipe is filled with the eluent and the adsorbent. Destruction of the glass by pressure apparently is prevented by the practically incompressible liquid communicating between inside and outside of the glass tube, thereby equalizing the pressure.

As the steel pipe 3, there can be employed any of the previously conventional steel tubes used for liquid chromatography. These steel pipes 3 can be combined with coupling means 7 and 7a, the so-called "Swagelok" couplings being most frequently employed. The steel pipes 3 are available in various lengths, from a few centimeters up to about 1 meter. The inner diameter thereof usually is between 2 mm. and 15 mm.

The dimensions of the glass pipe 2 obviously is dependent on those of the steel pipe 3 into which it is to be introduced. In accordance with a preferred embodiment, the outer diameter of the glass pipe usually is between 1.8 mm. and 14.8 mm. The wall thickness of the glass pipe can be chosen as desired, but even very thin-walled tubes, e.g., as thin as 0.5 mm., can be utilized. It was found that ordinary glass tubing can be used, so that no specially manufactured glass items are required.

The interspace 4 between the glass and the steel pipes preferably is relatively narrow, so that parallel positioning of the glass pipe within the steel pipe is ensured. The free space generally should range between about 0.1 mm. and 1 mm. A very thin film of liquid in this interspace 4 is sufficient to achieve the desired pressure equilizing effect. The porous ring 5 positioned at the feed end of the column makes it possible for liquid to enter the interspace 4 while still pressing the glass pipe 2 into leak-free fitting against the seal 6 when the coupling means 7 are tightened. The inner diameter of the ring 5 corresponds most advantageously to the diameter of the feed line 8. Porous polytetrafluoroethylene has proved to be especially advantageous as the porous material for the ring 5. However, it is also possible to employ other porous materials, for example glass fibers or fritted metals. The materials selected should be inert to the mobile phases employed in the chromatography.

The seal 6 seals the bottom or outlet end of glass pipe 2 with respect to the corresponding end of the steel pipe 3. A good seal must be effected at this point, so that pressure can build up in the interspace 4 after tightening the coupling means 7. Seal 6 must seal the interspace 4 absolutely tightly, since otherwise eluent would flow under the high pressure through the interspace 4 instead of through the interior of glass column 2 which, because packed with chromatographic carrier material, offers a higher flow resistance. All customary devices can be employed for the coupling means 7. Similarly, the feed line 8 and discharge line 10 correspond to the equipment customarily employed heretofore with steel columns.

Plug 11, which prevents the entrance of chromatographic carrier material 1 into the outlet or discharge line 10, can be made of any desired porous material but again, porous polytetrafluoroethylene is preferred. However, other porous materials inert to the mobile phases can be utilized, e.g., glass wool. The diameter of the plug 11 corresponds to the inner diameter of the glass pipe 2 and is firmly seated on the inner end of outlet line 10, and optionally also partially on the inner face of seal 6.

When using the column of the present invention, glass pipe 2, filled in the usual fashion with chromatographic adsorbent 1, is slid into steel pipe 3, against whose bottom end is pressed seal 6 and sleeve 13 by lower coupling members 7 and 7a. Glass pipe 2 is fitted at its lower end, prior to being filled with the adsorbent 1, with porous plug 11. After fitting ring 5, gasket 15 and inlet pipe 8 onto the upper end of the steel pipe 3 and sealing the end thereof with upper coupling fittings 7 and 7a, the column, filled in the dry state, is connected to the chromatograph. A pressure is produced in the interspace 4 through the porous sealing material 5 by a pump (not shown) connected to inlet line 8. The air in the interspace is compressed, since it cannot escape because of the seal 6. The remaining interspace 4 is filled with liquid in correspondence with the pressure level. The liquid also permeates the adsorbent 1. As soon as the interior of the glass pipe 2 is filled with the eluent, under a low pressure, the inlet pressure can be raised as rapidly as desired. Glass pipe 2 is not destroyed by the pressure ambient in the interspace 4. Surprisingly, the glass pipe 2 in this novel column system also withstands the various pressure changes occurring during chromatography, since, as is known, a very large pressure drop exists within the column filled with the sorbent, which can drop from above 200 atmospheres gauge to 1–3 atmospheres.

The novel column is utilized in all those cases wherein heretofore steel columns have been employed for the chromatography under pressure.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Column for liquid pressure chromatography comprising a single inner glass pipe, adapted to be filled with adsorbent, fitted within a single outer steel pipe with a narrow interspace between the inner wall of the steel pipe and the outer wall of the glass pipe, which interspace is sealed at the outlet end of the column, with a gasket formed from a substantially nonporous inert resilient plastic which is press fitted against the outlet end of both the glass pipe and the steel pipe, and is in restricted fluid communication with the interior of the glass pipe at the inlet end of the column, said fluid communication being provided by a porous annular packing ring press fitted against the inlet ends of both the glass pipe and the steel pipe.

2. Column according to claim 1, wherein the interspace between the glass pipe and the steel pipe is about 0.1 to 1 mm.

3. Column according to claim 1 wherein the resilient plastic is polytetrafluoroethylene.

4. Column according to claim 3, wherein the porous annular packing ring is formed of polytetrafluoroethylene.

5. Column according to claim 4, wherein the interspace between the glass pipe and the steel pipe is about 0.1 to 1 mm.

* * * * *